Patented Oct. 24, 1933

1,932,156

UNITED STATES PATENT OFFICE 1,932,156

PROCESS OF COATING

Albert Jean Ducamp and Marie Emile Alfred Baule, Paris, France

No Drawing. Application March 17, 1932, Serial No. 599,589, and in France March 24, 1931

5 Claims. (Cl. 91—70)

Our invention relates to means for protecting metals from corrosion by the formation of a varnish or enamel as a coating thereof. It is known that by dissolving in a fatty acid a suitable metallic oxide, the complex obtained is capable of acting, under proper conditions of temperature, as an oxidizing catalyzer in respect of fatty bodies or suitable resins and transforming them suddenly, by oxidation, into insulating varnishes which are not attacked by corroding elements and are sufficiently flexible.

According to the present invention, a copper oxide, such as copper protoxide CuO, is dissolved in naphthenic acids or preferably undecylenic acid, and we mix the complex obtained with distilled castor oil, i. e. castor oil from which heptylic aldehyde has been withdrawn by distillation.

With the distilled castor oil may also be utilized esters playing the part of plasticizers, in particular benzyl citrate, phthalate, ricinoleate, tartrate, etc.

The above mixture can be applied in any manner on the articles to be enamelled or varnished; the latter are heated to a suitable temperature and oxidation is thus caused suddenly, and consequently transformation into varnish or enamel of the distilled castor oil employed.

Heating may be effected either by the known methods of stoving, or by means of heating electrical resistances or jets of flame such as those of a soldering lamp or a blow pipe lamp, or the direct passage of an electric current or the production of eddy currents in the article to be coated.

In the case of an article of copper or copper alloy to be varnished or enamelled, it is not necessary to previously dissolve a copper oxide in the acids above mentioned but it suffices to oxidize the article either by heating it in the presence of air or oxygen, or preferably placing it at the anode of a galvanic bath, the electrolyte of which is constituted for instance by water containing ammonia.

The oxide formed on the surface of the copper article combines thereafter perfectly with the fatty acids for example with undecylenic acid, and performs the same catalyzing function as the above mentioned oxide.

It will be understood that the complex of undecylenic acid or naphthenic acid and metallic oxide mixed with distilled castor oil capable of being resinified by oxidation and polymerization plays the part, under the influence of heat, of an oxidizing catalyzer in respect of said distilled castor oil and transforms it into insulating varnishes or enamels, not attackable by corroding elements.

For applying such enamels or varnishes to the protection of oxidable metals against corrosion, a product with a base of distilled castor-oil is prepared, to which is incorporated complexes of undecylenic acid, and suitable metallic oxides, such as oxides of iron, copper, manganese, aluminum, titanium, etc.

Various pulverulent bodies may also be added to the product, such as graphite, preferably amorphous graphite for increasing resistance to certain corroding agents such as sea water, pigments capable of resisting the temperature of resinifying in order to obtain various colors or hues.

One or more plasticizers may also be added to the product, such as esters derived from benzyl in order to increase flexibility of the protecting layer.

One or more neutral hydrocarbons may be added, such as vaseline or paraffine so as to increase tightness of the protecting layer.

One or more waxes or natural gums may be added such as sandarac gum, gum-lac, etc. so as to facilitate resinifying, or also pulverulent derivatives of metalloids, such as silicon or boron so as to increase electrical or mechanical resistance of the protecting layer.

According as more or less fluidity of the product is desired with regard to the method of applying it (by a pistol, a pad, or dipping, etc.) the necessary quantity of one or more known solvents is added (anhydrous alcohols, esters, hydrocarbons, etc.)

As an example of the product according to the invention the following composiiton may be stated:

For 100 parts of the product:
40 parts of distilled castor-oil,
10 parts of undecylenic acid,
1 part of copper oxide CuO
1 part of iron oxide or colcothar,
24 parts of petroleum spirit
24 parts of practically anhydrous ethyl alcohol.

According to the different cases of employment, the above composition may be added with for instance 8 to 20 per cent pulverulent graphite, or 8 to 20 per cent hydrated magnesia silicate or the same proportion of other pulverulent or liquid products as above stated.

The product thus prepared is applied on the surface of the metal to be protected which is always more or less oxidized, without previously cleaning said surface, by dipping or by means of a brush, pistol or any known means.

The metal thus prepared is then heated, preferably in a furnace or stove or by means of a flame. During heating, complicated chemical reactions take place.

The metallic oxides coating the surface metal to be protected are first dissolved. Then the undecylenic or naphthenic acids attach the surface of the metal itself, and finally a chemical combination takes place, which gives as result a solid layer integral with the metal to be protected.

During heating and the subsequent chemical reactions, a smoke gas escapes. Heating must be progressive until there is no longer escape of smoke. The chemical reaction is then terminated. With the formula given above, the temperature should rise progressively up to 250° centigrade.

According to the thickness of the protecting coating desired, a second or third layer of the same product may be applied successively, or of one of the variants of the product, while operating in the same manner.

The successive layers combine to each other and form a resulting homogeneous layer. The latter affords the following improvements in the protection of metals:

It stops all the previous corrosions.

It has remarkable resistance to oxidizing agents, such as salt air, dampness, etc., chemical agents, acids or bases. It is insoluble in hydrocarbons, alcohols or esters.

It is hard, harder than red copper or aluminum. It is flexible and endures several bendings. Its adherence to the metal enables it to support shocks. Its electrical resistance is very high.

What we claim is:—

1. A process of producing a coating on metals which comprises mixing distilled castor oil, free from heptylic aldehyde, with undecylenic acid and a metallic oxide, applying the mixture on the metallic article to be treated, and heating the whole, whereby the distilled castor oil is resinified and oxidized under the catalytic action of the combination of the metallic oxide and undecylenic acid, so as to form an insulating resistant varnish.

2. A process of producing a coating on metals which comprises distilling castor oil so as to remove heptylic aldehyde therefrom, mixing the resulting product with undecylenic acid and a metallic oxide, applying the mixture on the metallic article to be treated, and heating the whole, whereby the distilled castor oil is resinified and oxidized under the catalytic action of the combination of the metallic oxide with undecylenic acid, so as to form an insulating resistant varnish.

3. A process of producing a coating on metals which comprises distilling castor oil so as to remove heptylic aldehyde therefrom, mixing the resulting product with undecylenic acid, naphthenic acids, and a metallic oxide, applying the mixture on the metallic article to be treated, and heating the whole.

4. A process of producing a coating on metals which comprises distilling castor oil so as to remove heptylic aldehyde acid therefrom, mixing the resulting product with undecylenic acid and a copper oxide, applying the mixture onto the article to be treated, and heating the whole.

5. A process of producing a coating on metals which comprises distilling castor oil so as to remove heptylic aldehyde therefrom, mixing the resulting product with undecylenic acid, naphthenic acids, and copper oxide, applying the mixture onto the article to be coated, and heating the whole.

ALBERT JEAN DUCAMP.
MARIE EMILE ALFRED BAULE.